United States Patent [19]

Deleens et al.

[11] 4,252,920

[45] Feb. 24, 1981

[54] METHOD FOR PREPARING ETHER-ESTER-AMIDE BLOCK POLYMERS FOR AMONG OTHER MOULDING, EXTRUDING OR SPINNING USES

[75] Inventors: Gérard Deleens, Bernay; Jacques Ferlampin, Saulx-les-Chartreux; Michèle Gonnet, Gif-sur-Yvette, all of France

[73] Assignee: ATO Chimie, Courbevoie, France

[21] Appl. No.: 938,525

[22] Filed: Aug. 31, 1978

[30] Foreign Application Priority Data

Sep. 2, 1977 [FR] France ............................. 77 26678

[51] Int. Cl.³ ...................... C08L 71/02; C08L 77/12
[52] U.S. Cl. ................................... 525/430; 525/408; 525/411; 525/425; 525/926
[58] Field of Search .................. 260/857 PG, 857 PE; 525/408, 411, 430, 926, 425

[56] References Cited

U.S. PATENT DOCUMENTS

| 3,636,135 | 1/1972 | Garforth | 260/857 PG |
|---|---|---|---|
| 3,655,821 | 4/1972 | Lofquist | 260/857 PG |
| 3,839,245 | 10/1974 | Schlossman | 260/857 PG |
| 3,923,925 | 12/1975 | Schneider | 260/857 PG |

FOREIGN PATENT DOCUMENTS

| 972896 | 8/1975 | Canada | 260/857 PG |
|---|---|---|---|
| 2273021 | of 0000 | France | |

*Primary Examiner*—Paul Lieberman
*Attorney, Agent, or Firm*—Burgess, Ryan and Wayne

[57] ABSTRACT

Process for preparing ether-ester-amide block polymers. It consists in the reaction, in the molten state of a dicarboxylic polyamide having COOH end groups with a polyoxyalkylene glycol having hydroxyl end groups in the presence of metallic tetraalkoxide(s) as catalysts. The tetraalkoxide(s) used are of the formula $M(OR)_4$ where M is Zr or Hf and the radicals R, identical or different are linear or branched $C_1$–$C_{24}$ alkyl radicals.

18 Claims, No Drawings

METHOD FOR PREPARING ETHER-ESTER-AMIDE BLOCK POLYMERS FOR AMONG OTHER MOULDING, EXTRUDING OR SPINNING USES

The present invention is related to a method for preparing ether-esteramide block polymers to be used among other uses, in moulding, extruding or spinning compositions, by reaction in the molten state of a dicarboxylic polyamide having COOH end groups with a polyoxyalkylene glycol having hydroxyl end groups.

The chains of these block polymers are constituted by recurrent units of the formula

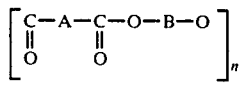

wherein A is the polyamide sequence resulting from the loss by the dicarboxylic polyamide of the two COOH functions and B is the polyoxyalkylene glycol sequence resulting from the loss of the two hydroxyl groups by the polyoxyalkylene glycol chain having hydroxyl end groups, whereas n indicates the number of recurrent units constituting the block polymer chain.

A method of synthesis of such block polymers which may be used as moulding or extruding materials is described in French published patent application 2 273 021. The said method involves the reaction by fusion at high temperature and under high vacuum of dicarboxylic polyamide with polyoxyalkylene glycol in the presence of a titanium tetraalkoxide catalyst.

Although the said method, using the above-mentioned titanium catalyst, allows ether-ester-amide block polymer to be obtained, which may be used as moulding or extruding products, it is not entirely satisfactory due, among other reasons, to the fact that the obtained block polymer products have a residual yellowish coloration which limits their field of application.

Now it has been discovered that, in such a method, it is possible to obtain ether-ester-amide block polymers substantially free from residual coloration, by replacing the titanium tetraalkoxide used as catalyst with a zirconium or hafnium tetraalkoxide. Moreover it has been found that such a replacement results in a higher catalytic efficiency, that is, on the one hand, less zirconium or hafnium catalyst is used for an equivalent reaction time, or alternatively the reaction time is reduced with the same amounts of said catalyst, to obtain a block polymer product having the required properties, and, on the other hand when, using the same amounts of zirconium or hafnium catalyst and the same reaction times, the obtained block polymer product has an intrinsic viscosity and a VICAT point higher than those of the block polymer products obtained when using the titanium catalyst.

It is an object of the present invention to provide a process for preparing ether-ester-amide block polymer by reaction in the molten state of a dicarboxylic polyamide, having the COOH functions at the ends of the chain, with a polyoxyalkylene glycol chain having hydroxyl end groups in the presence of one or more metal tetraalkoxides as catalyst, wherein said tetraalkoxide(s) used as the catalyst have the general formula $M(OR)_4$, in which M represents zirconium or hafnium and R, identical or different, are alkyl radical, linear or branched, having 1 to 24 carbon atoms.

The alkyl radicals in $C_1$ to $C_{24}$ from which are selected the radical R of the zirconium or hafnium tetraalkoxides used as catalysts in the process of the invention may be, for example, methyl, ethyl, propyl, isopropyl, butyl, ethylhexyl, decyl, dodecyl or hexadodecyl radicals. The preferred catalysts are zirconium or hafnium tetraalkoxides wherein the radicals R, identical or different, are alkyl radicals in $C_1$ to $C_8$. Examples of such catalysts are particularly: $Zr(OC_2H_5)_4$, $Zr(O\text{-iso }C_3H_7)_4$, $Zr(OC_4H_9)_4$, $Zr(OC_5H_{11})_4$, $Zr(OC_6H_{13})_4$, $Hf(OC_2H_5)_4$, $Hf(OC_4H_9)_4$, $Hf(O\text{-iso }C_3H_7)_4$.

The action of the catalyst according to the invention has many advantages for the polycondensation reaction between dicarboxylic polyamide and polyoxyalkelene glycol as well as for the quality of the obtained block polymer product. At the beginning of the reaction two non-miscible phases are present, one of which is the polyamide phase which is not very fluid, and in the absence of the catalyst the polycondensation reaction is only very partial, viscosities remain low and the obtained product contains a high proportion of unreacted polyoxyalkylene glycol which makes it very brittle and unable to undergo transformation operations such as moulding, calendering or extruding. On the contrary, when carrying out the polycondensation reaction in the molten state and in the presence of a zirconium or hafnium tetraalkoxide as in the method according to the invention, a block polymer product is obtained which has good mechanical properties meeting particularly the requirements of the operations of transformation into finished products by moulding, extruding or spinning.

The catalyst used in the process according to the invention may consist solely of one or more of the tetraalkoxides of formula $M(OR)_4$ hereinabove defined. It can also be formed by combination of one or more of said tetraalkoxides with one or more alkaline or alkaline-earth alcoholates of formula $(R_1O)_pY$ wherein $R_1$ is a hydrocarbon residue, advantageously a $C_1$–$C_{24}$ and preferably $C_1$–$C_8$ alkyl residue, Y represents an alkaline or alkaline-earth metal and P is the valence of Y. The amounts of alkaline or alkaline-earth alcoholate and of zirconium of hafnium tetraalkoxides which may be reacted to compose the mixed catalyst, may vary within broad limits. However, it is preferable to use such amounts of alcoholate and tetraalkoxides that the molar proportion of alcoholate is substantially equal to the molar proportion of tetraalkoxide.

The weight proportion of catalyst, that is of the tetraalkoxide(s) when the catalyst contains no alkaline or alkaline-earth alcoholate, or of both the tetraalkoxide(s) and the alkaline or alkaline-earth alcoholate(s) when the catalyst is formed by the combination of these two types of compounds, varies advantageously from 0.01 to 5% of the weight of the mixture of dicarboxylic polyamide and polyoxyalkylene glycol, and is preferably between 0.05 and 2% of this weight.

The dicarboxylic polyamides having their carboxylic functions attached at the ends of the polyamide chain are obtained in a manner well known in the art, for example, by polycondensation of one or several lactams and/or one or several aminoacids, or also by polycondensation of a dicarboxylic acid with a diamine, said polycondensations being performed in the presence of an excess of an organic dicarboxylic acid the carboxylic functions of which are preferably attached to each end of the molecule; these dicarboxylic acids become attached during the polycondensation as components of the polyamide macromolecular chain, particularly at the ends of said chain, which allows a α-ω-dicarboxylic polyamide to be obtained. On the other hand the dicarboxylic acid acts as a chain limiting agent; this is why an excess of the diacid is introduced over the amount necessary to obtain the dicarboxylic polyamide and the amount of the excess allows to condition the macromolecular chain length and consequently the average molecular weight of the dicarboxylic polyamide.

The polyamide can be obtained from lactams and/or aminoacids, the hydrocarbon chain of which contains a number of carbon atoms comprised between 4 and 14 like for example, caprolactam, oenantholactan, dodecalatam, undecanolactam, 11-amino-undecanoic acid, 12-amino-dodecanoic acid.

Non-limitative examples of polyamides resulting from the polycondensation of a dicarboxylic acid with a diamine are the condensation products of hexamethylene diamine with adipic, azelaic, sebacic and 1-12-docecanedioic acids, respectively known as nylons 6-6, 6-9, 6-10 and 6-12 as well as the condensation product of nonamethylene diamine with adipic acid known as nylon 9-6.

Dicarboxylic acids, which are used in the synthesis reaction of dicarboxylic polyamide, on the one hand to allow the fixation of a carboxylic group at each end of the polyamide chain and on the other hand as chain limiting agent, are dicarboxylic acids having 4 to 20 carbon atoms, particularly alkane-dioic acids such as for example succinic, adipic, suberic, azelaic, sebacic, undecanedioic and dodecanediocic acids, or also cycloaliphatic or aromatic dicarboxylic acids such as for example terephthalic isophthalic, and 1,4-cyclohexane-dicarboxylic acids. Such dicarboxylic acids are used in excess in the proportion necessary to obtain a polyamide having the desired molecular weight, according to the conventional calculations of the polycondensation technique.

The average molecular weights of dicarboxylic polyamides may vary within rather broad limits, advantageously between 300 and 15,000 and preferably between 800 and 5000.

The polyoxyalkylene glycols having hydroxy end groups are selected from the group consisting of linear or branched polyoxyalkylene glycols the alkylene radical of which contains at least two carbon atoms, particularly polyoxyethylene glycol, polyoxypropylene glycol, polyoxytetramethylene glycol, the copolymers deriving from such polyalkylene glycols and the mixtures of such polyoxyalkylene glycols and/or of their copolymers.

The average molecular weights of these polyoxyalkylene glycols having hydroxyl end groups may vary rather widely advantageously between 100 and 6000 and preferably between 200 and 3000.

The weight proportion of polyoxyalkylene glycol to the total weight of polyoxyalkylene glycol and dicarboxylic polyamide reacted to form the ether-ester-amide polymer may vary from 5 to 85%, the said proportion being preferably between 10 and 50%.

The polycondensation reaction between dicarboxylic polyamide and dihydroxy polyoxyalkylene glycol to form the ether-ester-amide block polymer is carried out, under stirring, by contacting the said reagents in the presence of the catalyst, operating in the molten state, that is at temperatures higher than the melting points of dicarboxylic polyamide and polyoxyalkylene glycol. The temperatures selected for this reaction have to be high enough to maintain the molten reaction medium in a sufficiently fluid state to allow, by stirring, a good contact between the reagent.

These temperatures selected above the melting points of dicarboxylic polyamide and polyoxyalkylene glycol having dihydroxyl end group may be advantageously comprised between 100° and 400° C. and preferably between 200° and 300° C.

According to the circumstances, the reaction may be performed under a more or less high vacuum, for example about 0.05 to 5 mmHg, or under inert atmosphere at a pressure of about atmospheric pressure.

The reaction time may vary from 10 mm to 10h and is preferably comprised between 1 and 5 hours. The said reaction time depends on the nature of the polyoxyalkylene glycol used and has to be long enough to obtain the final viscosity necessary to have products with appropriate properties for use as plastic materials for moulding or extruding.

In order that the polycondensation reaction may be performed under conditions favourable to the obtention of ether-ester-amide block polymers, it is preferable to respect the equimolarity between the carboxylic groups of the dicarboxylic polyamide and the hydroxyl groups of the polyoxyalkylene glycol which are reacted with one another.

Additives such as stabilizers against light and heat, antioxidants, fire resistant agents, dyestuffs, may be added to the obtained polycondensate before the transformation operations or, if possible, during the polycondensation operation which produces the ether-ester-amide block polymer in order to improve the properties of the product or to modify them according to the requirements of a specific application.

The checking and identification measurements selected to characterize the prepared products are the following:
VICAT point in °C. (ASTM D 1525 67T standard)
intrinsic viscosity (determined at 25° C. in solution in metacresol)
tensile characteristics (ASTM D6 38 67T standard)
Torsion modulus (ASTM D1043 61T standard according to the Clash and Berg method)

The following examples are given in a non limiting way to illustrate the invention.

EXAMPLE 1

460 g of dicarboxylic 6-polyamide (having an average molecular weight of 2300), previously prepared by polycondensation of ε-caprolactam in the presence of adipic acid, were introduced into a 2 liter reactor. Then 80 g of dihydroxylated polyoxyethylene (having an average molecular weight of 400) were added, and thereafter 1.1 g (i.e. 2.8 $10^{-3}$ mole) of $Zr(OC_4H_9)_4$.

The mixture thus formed was put under inert atmosphere and heated up to 260° C.

The reactor was then put under reduced pressure while maintaining a vigorous stirring as soon as the reagents were melted. The reaction was carried in at 260° C. under 1 Torr for 2 hours.

The obtained product had an intrinsic viscosity of 1.3. It showed in differential thermal analysis a crystalline fusion peak at 202° C. The determination of its average molecular weight $M_w$ by gel permeation chromatography in hexamethylphosphotriamide at 103° C., gave a $M_w$ value of 44800 for a polydispersion index of 2.8.

It should be remembered that the polydispersion index is equal to the ratio of the average molecular weight in $M_w$ to the average molecular weight in number $M_n$.

The product is injected on a press to produce standardized test samples for carrying out tensile characteristics and determining the torsion modulus.

Tensile characteristics were found to be:
threshold extension (under 155 kg/cm$^2$): 11%.
breaking extension (under 520 kg/cm$^2$): 405%.

The torsion modulus H has also been found to be 1240 kg/cm$^2$ at 24° C., and the VICAT point of 145° C. under 5 kg with a heating rate of 50° C. per hour.

EXAMPLES 2 to 6

Conditions similar to those used in example 1 were used, either in the absence of catalyst (example 2), or using a titanium catalyst as described in the prior art (example 3) or catalysts according to the present invention (examples 4 to 6).

The obtained results are shown in table 1:

TABLE 1

| Example | Catalyst Nature | Catalyst amount (mole) | Intrinsic viscosity | VICAT point under 5kg (°C.) | Remarks regarding the obtained product |
|---|---|---|---|---|---|
| 2 | NO | NO | 0.4 | | heterogene and brittle |
| 3 | Ti(OC$_4$H$_9$)$_4$ | 2.8 × 10$^{-3}$ | 1.15 | 140 | slightly yellow |
| 4 | Zr(O-iso-C$_3$H$_7$)$_4$ | 2.8 × 10$^{-3}$ | 1.31 | 145 | White |
| 5 | Hf(OC$_4$H$_9$)$_4$ | 2.8 × 10$^{-3}$ | 1.35 | 147 | White |
| 6* | Zr(OC$_4$H$_9$)$_4$ NaOC$_4$H$_9$ | 2.8 × 10$^{-3}$ 2.8 × 10$^{-3}$ | 1.40 | 148 | White |

*The catalyst of this example is prepared in an anhydrous medium by dissolving 1g of sodium in 99g of n-butanol, then adding 16.7g of zirconium tetrabutoxide [Zr(OC$_4$H$_9$)$_4$] the solution being thereafter diluted to 200ml with n-butanol.

From the results indicated in Table 1 it may be noted that:
the ether-ester-amide block polymers obtained in the presence of a catalyst have a low intrinsic viscosity; they are heterogenous and brittle and therefore cannot be used as moulding, extruding or spinning products, whereas the ether-ester-amides block polymers prepared in the presence of a catalyst may be used for such applications.

The products obtained in the presence of the catalysts according to the invention (examples 4 to 6) are white while the product prepared with the titanium catalyst (example 3) has a slightly yellow residual colour.

For the same molecular amount of catalyst and the same reaction time, the use of catalysts according to the invention results in obtaining products having an intrinsic viscosity and a VICAT point higher than those of the products prepared with a titanium catalyst of the same nature.

Moreover, when comparing the results of examples 1 to 6 it appears that the combination of an alcoholate with the catalysts according to the invention increases their efficiency even more.

EXAMPLE 7

Operating as in example 1, 390 g of dicarboxylic 6-polyamide (having an average molecular weight of 1300) were reacted with 195 g of dihydroxy polyoxytetramethylene (having an average molecular weight of 650), in the presence of 1 g of zirconium tetraisopropoxide [Zr(O-isoC$_3$H$_7$)$_4$], at 260° C. under 1 torr for 2.5 hours.

A very white ether-ester-amide polymer was obtained, which shows an intrinsic viscosity of 1.55 and a melting point of 192° C.

Its tensile characteristics are the following: threshold extension (under 110 kg/cm$^2$): 12.5%. breaking extension (under 440 kg/cm$^2$): 520%.

The torsion modulus G was 850 kg/cm$^2$ at 20° C. and the VICAT point was 163° C. under 1 kg.

EXAMPLE 8

Operating as in example 1, 400 g of dicarboxylic 11-polyamide (having an average molecular weight of 2000) were reacted with 200 g of dihydroxy polyoxypropylene (having an average molecular weight of 1000), in the presence of 1.4 g of hafnium tetraethoxide [Hf(OC$_2$H$_5$)$_4$], at 260° C. under 1 torr for 4 hours.

The obtained product had the following properties:
colour: broken white
intrinsic viscosity: 1.15
melting point: 173° C.
torsion modulus G: 700 kg/cm$^2$ at 22° C.
VICAT point: 160° C. under 1 kg
Tensile characteristics: threshold extension (under 140 kg/cm$^2$): 18%. breaking extension (under 410 kg/cm$^2$): 510%.

Operating in similar conditions, but replacing the hafnium catalyst by the same molecular amount of titanium tetraethoxide [Ti(OC$_2$H$_5$)$_4$], 6 hours were necessary to obtain a product having the same viscosity; furthermore, the product obtained in the presence of the titanium catalyst had a yellowish residual colour.

EXAMPLE 9

A catalyst according to the invention was prepared in the following manner: 1.41 g of magnesium turnings were dissolved, in an anhydrous medium, in 300 ml of anhydrous n-butanol. The solution was reflux heated for 4 hours, then 40.5 g of zirconium tetrabutoxide [Zr(OC$_4$H$_9$)$_4$] were added and reflux heating was carried on for 1 hour. The solution was cooled and sheltered from the air.

Operating as described in example 1, 525 g of dicarboxylic 12-polyamide (having an average molecular weight of 3500) prepared by polycondensation of dodecalactam in the presence of adipic acid, was reacted with 90 g of dihydroxy polyoxyethylene (having an average molecular weight of 600) in the presence of 10 ml of the catalyst solution prepared as described hereinabove, the reaction being performed at 260° C. and under 1 torr for 2 hours.

The obtained product had the following properties.

| | |
|---|---|
| colour | white |
| intrinsic viscosity | 1.30 |
| melting point | 178° C. |
| torsion modulus G | 1600kg/cm² at 24° C. |
| VICAT point | 156° C. under 5kg |
| tensile characteristics | threshold extension (under 180kg/cm²) : 10% <br> breaking extension (under 580kg/cm² : 405% |

What is claimed is:

1. A process for preparing ether-ester-amide block polymer comprising reacting in the molten state a dicarboxylic polyamide, the COOH functions of which are located at the ends of the chain, with a polyalkylene glycol having hydroxyl end groups, in the presence of one or more metallic tetraalkoxides as catalyst, wherein the tetraalkoxide(s) used as the catalyst have the general formula $M(OR)_4$, in which M is zirconium or hafnium and the symbols R, identical or different, are linear or branched $C_1$ to $C_{24}$ alkyl radicals.

2. A process according to claim 1, wherein the symbols R, identical or different, of the formula defining the zirconium or hafnium tetraalkoxides are alkyl radicals in $C_1$ to $C_8$.

3. A process according to claim 1, wherein the catalyst comprises the combination of one or more of the tetraalkoxides with one or more alcoholates of formula $(R_1O)_pY$ in which Y is an alkaline or alkaline-earth metal, p is the valence of Y and $R_1$ is a monovalent $C_1$ to $C_{24}$ alkyl radical.

4. A process according to claim 3, wherein $R_1$ is a $C_1$ to $C_8$ alkyl radical.

5. A process according to claims 1, 2, 3, or 4, wherein the catalyst proportion varies from 0.01 to 5%, and preferably from 0.05 to 2% by weight of dicarboxylic polyamide and polyoxyalkylene glycol.

6. A process according to claims 1, 2, 3, or 4, wherein the average molecular weight of the dicarboxylic polyamide is between 300 and 1500.

7. A process according to claim 8, wherein the said average molecular weight is between 800 and 5000.

8. A process according to claim 6, wherein the average molecular weight of the polyoxyalkylene glycol is between 100 and 6000.

9. A process according to claim 8, wherein the average molecular weight is between 200 and 3000.

10. A process according to claim 1, wherein the weight proportion of polyoxyalkylene glycol to the total weight of the reacted dicarboxylic polyamide and polyoxyalkylene glycol is between 5 and 85%.

11. A process according to claim 10, wherein in the said weight proportion is between 10 and 50%.

12. A process according to claim 1, wherein the temperature selected for performing the reaction in the molten state, which is higher than the melting points of dicarboxylic polyamide and polyoxylakylene glycol, is between 100° and 400° C.

13. A process according to claim 12, wherein the said temperature is between 200° and 300° C.

14. A process according to claim 1, wherein the reaction in the molten state is performed under a vacuum of about 0.05 to 5 mmHg, or under an inert atmosphere at a pressure of about the atmospheric pressure.

15. Ether-ester-amide block polymers obtained by the method according to claims 1, 2, 3,4, 10, 11, 12, 13, or 14.

16. An article molded from a polymer of claim 15.

17. An article extruded from a polymer of claim 15.

18. A fiber spun from a polymer of claim 15.

* * * * *

UNITED STATES PATENT AND TRADEMARK OFFICE
CERTIFICATE OF CORRECTION

PATENT NO. : 4,252,920  Page 1 of 2

DATED : February 24, 1981

INVENTOR(S) : Gerard Deleens, et al

It is certified that error appears in the above—identified patent and that said Letters Patent is hereby corrected as shown below:

Column 1, line 7: "esteramide" should be --ester-amide--.

Column 2, line 16: "polyoxyalkelene" should be --polyoxyalkylene--.

line 43: "P" should be --p--.

Column 3, line 16: "dodecalatam" should be --dodecalactam--.

line 33: "dodecanediocic" should be --dodecanedioic--

Column 5, line 3: "weight in $\overline{M}_w$" should be --weight in weight $\overline{M}_w$--.

line 10: "H" should be --G--.

line 40: "presence" should be --absence--.

Column 8, line 6: "claim 8" should be --claim 6--.

line 5: "1500" should be --15000--.

UNITED STATES PATENT AND TRADEMARK OFFICE
CERTIFICATE OF CORRECTION

PATENT NO. : 4,252,920

DATED : February 24, 1981

INVENTOR(S) : Gerard Deleens, et al

It is certified that error appears in the above—identified patent and that said Letters Patent is hereby corrected as shown below:

Column 8, line 17: "wherein in the" should be --wherein the--.

Signed and Sealed this

Fifteenth Day of September 1981

[SEAL]

Attest:

Attesting Officer

GERALD J. MOSSINGHOFF

Commissioner of Patents and Trademarks